United States Patent
Kim et al.

(10) Patent No.: US 12,499,558 B2
(45) Date of Patent: Dec. 16, 2025

(54) APPARATUS AND METHOD FOR MONITORING MOVING TARGET BASED ON COMPLEMENTARY GIMBAL CONTROL THROUGH DISPLACEMENT PARTITIONING

(71) Applicant: AGENCY FOR DEFENSE DEVELOPMENT, Daejeon (KR)

(72) Inventors: Daehwan Kim, Daejeon (KR); Hyunja Im, Daejeon (KR); Jeongseok Kim, Daejeon (KR); Daeyeon Kim, Daejeon (KR); Daikyung Hyun, Daejeon (KR); Wonhyuk Yang, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 308 days.

(21) Appl. No.: 18/342,741

(22) Filed: Jun. 28, 2023

(65) Prior Publication Data
US 2024/0005517 A1    Jan. 4, 2024

(30) Foreign Application Priority Data
Jun. 29, 2022    (KR) .................. 10-2022-0080017

(51) Int. Cl.
*G06T 7/20*    (2017.01)
*H04N 23/695*    (2023.01)

(52) U.S. Cl.
CPC ............. *G06T 7/20* (2013.01); *H04N 23/695* (2023.01)

(58) Field of Classification Search
CPC ....... G06T 7/20; H04N 23/695; H04N 23/661
USPC .......................................................... 382/103
See application file for complete search history.

(56) References Cited

U.S. PATENT DOCUMENTS

| 9,458,963 | B1 | 10/2016 | Choi et al. | |
| 10,880,464 | B1* | 12/2020 | Kim | .................. G06T 7/20 |
| 2015/0110345 | A1* | 4/2015 | Weichselbaum | ......... H04N 7/18 |
| | | | | 382/103 |

FOREIGN PATENT DOCUMENTS

| JP | 3204705 | 6/2016 |
| KR | 1020130066909 | 6/2013 |
| KR | 102068800 | 1/2020 |

OTHER PUBLICATIONS

"Office Action of Korea Counterpart Application", issued on Aug. 26, 2022, with English translation thereof, pp. 1-13.
"Notice of Allowance of Korea Counterpart Application", issued on Nov. 11, 2022, with English translation thereof, pp. 1-11.

* cited by examiner

*Primary Examiner* — Neil R McLean
(74) *Attorney, Agent, or Firm* — JCIPRNET

(57) ABSTRACT

Provided are an apparatus and method for monitoring a moving target based on complementary gimbal control through displacement partitioning, wherein the apparatus includes a processor configured to detect the moving target on the basis of information regarding an image acquired from a camera mounted on a gimbal, acquire first control information of an operator regarding the gimbal, which is input in response to the moving target, acquire second control information regarding the gimbal, which is calculated in response to the operation of detecting the moving target, and control the gimbal on the basis of the first control information and second control information.

11 Claims, 6 Drawing Sheets

APPARATUS AND METHOD FOR MONITORING MOVING TARGET BASED ON COMPLEMENTARY GIMBAL CONTROL THROUGH DISPLACEMENT PARTITIONING

CROSS-REFERENCE TO RELATED APPLICATION

This application is based on and claims priority under 35 U.S.C. § 119 to Korean Patent Application No. 10-2022-0080017, filed on Jun. 29, 2022, in the Korean Intellectual Property Office, the disclosure of which is incorporated by reference herein in its entirety.

BACKGROUND

1. Field

The disclosure relates to an apparatus and method for monitoring a moving target based on complementary gimbal control through displacement partitioning.

2. Description of the Related Art

The related art, which is required by systems that perform surveillance reconnaissance by displaying moving targets by using image information acquired from cameras installed on fixed or mobile platforms, includes three items as follows. The first item is a control technology that allows operators to adjust angles of cameras by directly operating gimbals and performing control to desired points. The second item is a technique that detects changes from image data and automatically detects moving targets, and at this time, different types of moving target detection techniques need to be used according to whether fixed or mobile platforms are present. The third item is a control technique that continuously adjusts angles of cameras installed as automatically detected targets.

Existing systems are designed to operate according to two types of modes set by implementing each of three types of technologies described above. In other words, in a manual mode, surveillance reconnaissance is performed through continuous gimbal control by operators, or in an automatic mode, systems, which detect moving targets by using automated moving target detection and gimbal control technology, operate. In existing systems described above, the manual and automatic modes are completely distinguished from each other, operating modes of operators need to be set, and information compatibility between two operating modes is not easy. Therefore, the existing systems have limitations in performance in terms of the continuity of surveillance reconnaissance. In addition, in the case of the automatic mode, satisfactory performance is not easy to produce in an environment in which the performance of detecting moving targets is degraded, and thus, continuous intervention by the operator is needed.

Meanwhile, a moving target indication (MTI) technology based on image information acquired from cameras uses various processing methods according to whether fixed or mobile platforms are present. In other words, on the fixed platforms, moving targets need to be detected by calculating difference images with input images through background image modeling, and on mobile platforms, moving targets need to be detected by considering motion information of cameras together to compensate for difference images. Technologies as described above produce relatively high performance, but is not easy to be processed in real time due to the high computational complexity when operating in embedded systems. In particular, when gimbal control needs to be performed by using the result of an MTI technology, a processing speed of the MTI technology may be lower than a processing speed of the gimbal control, and at this time, continuous gimbal control is not easy, and thus, movements of gimbals may be interrupted or unstable. In addition, when distances between moving targets and mobile surveillance reconnaissance platforms are shot, movement of the moving targets increases in input images. Therefore, there is a need for a gimbal control technology for moving a detected target to a central point of an image regardless of a distance, and a speed of the target.

SUMMARY

Provided are an apparatus and method for monitoring a moving target based on complementary gimbal control through displacement partitioning. However, the problem is an example, and the scope of the disclosure is not limited thereto.

Additional aspects will be set forth in part in the description which follows and, in part, will be apparent from the description, or may be learned by practice of the presented embodiments of the disclosure.

According to an aspect of the disclosure, an apparatus for monitoring a moving target includes a processor configured to detect the moving target on the basis of information regarding an image acquired from a camera mounted on a gimbal, acquire first control information of an operator regarding the gimbal, which is input in response to the moving target, acquire second control information regarding the gimbal, which is calculated in response to the operation of detecting the moving target, and control the gimbal on the basis of the first control information and second control information, wherein the second control information is calculated on the basis of first displacement information regarding a detection location of the moving target from a central point of a screen of the image and second displacement information regarding a movement location of the moving target from the detection location.

The processor may be further configured to control the gimbal on the basis of the first control information and the second control information by giving a predetermined weight to the first control information compared to the second control information.

The processor may be further configured to calculate, on the basis of the first displacement information, a pixel error value between the central point of the screen of the image and the detection location of the moving target, calculate a gimbal movement angle step that divides the pixel error value in phases by using a minimum value and a maximum value of a gimbal movement angle step determined in advance for the pixel error value, and control the gimbal on the basis of the gimbal movement angle step.

The processor may be further configured to continuously control the gimbal by maintaining the gimbal movement angle step, calculate a current gimbal orientation angle on the basis of information acquired from a gimbal sensor provided in the gimbal, calculate a target gimbal orientation angle on the basis of the first displacement information, and stop an operation of the gimbal on the basis of the current gimbal orientation angle and the target gimbal orientation angle.

The processor may be further configured to stop the operation of the gimbal on the bias of a difference between the current gimbal orientation angle and the target gimbal orientation angle.

The processor may be further configured to calculate second displacement information regarding a movement location from the detection location of the moving target between detection units in the operation of detecting the moving target and correct the second displacement information on the basis of location information of the moving target.

According to another aspect of the disclosure, a method for monitoring a moving target includes detecting a moving target on the basis of information regarding an image acquired from a camera mounted on a gimbal, acquiring first control information of an operator regarding the gimbal, which is input in response to the moving target, acquiring second control information regarding the gimbal, which is calculated in response to the operation of detecting the moving target, and controlling the gimbal on the basis of the first control information and the second control information, wherein the second control information is calculated on the basis of first displacement information regarding a detection location of the moving target from a central point of a screen of the image and second displacement information regarding a movement location of the moving target from the detection location.

The controlling the gimbal on the basis of the first control information and the second control information may include controlling the gimbal on the basis of the first control information and the second control information by giving a predetermined weight to the first control information compared to the second control information.

The controlling the gimbal on the basis of the first control information and the second control information may include calculating, on the basis of the first displacement information, a pixel error value between the central point of the screen of the image and the detection location of the moving target, calculating a gimbal movement angle step that divides the pixel error value in phases by using a minimum value and a maximum value of a gimbal movement angle step determined in advance for the pixel error value, and controlling the gimbal on the basis of the gimbal movement angle step.

The controlling the gimbal on the basis of the gimbal movement angle step may include continuously controlling the gimbal by maintaining the gimbal movement angle step, calculating a current gimbal orientation angle of the gimbal on the basis of information acquired from a gimbal sensor provided in the gimbal, calculating a target gimbal orientation angle of the gimbal on the basis of the first displacement information, and stopping an operation of the gimbal on the basis of the current gimbal orientation angle and the target gimbal orientation angle.

The stopping the operation of the gimbal may include stopping the operation of the gimbal on the basis of a difference between the current gimbal orientation angle and the target gimbal orientation angle.

The controlling the gimbal on the basis of the first control information and the second control information may include calculating second displacement information regarding a movement location from the detection location of the moving target between detection units in the operation of detecting the moving target, and correcting the second displacement information on the basis of location information of the moving target acquired from a navigation device provided in the moving target.

According to an aspect of the disclosure, a computer program stored in a recording medium is provided to execute the method by using a computer.

Aspects, features, and advantages other than those described above will be apparent from the description, claims, and drawings for implementing the following disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
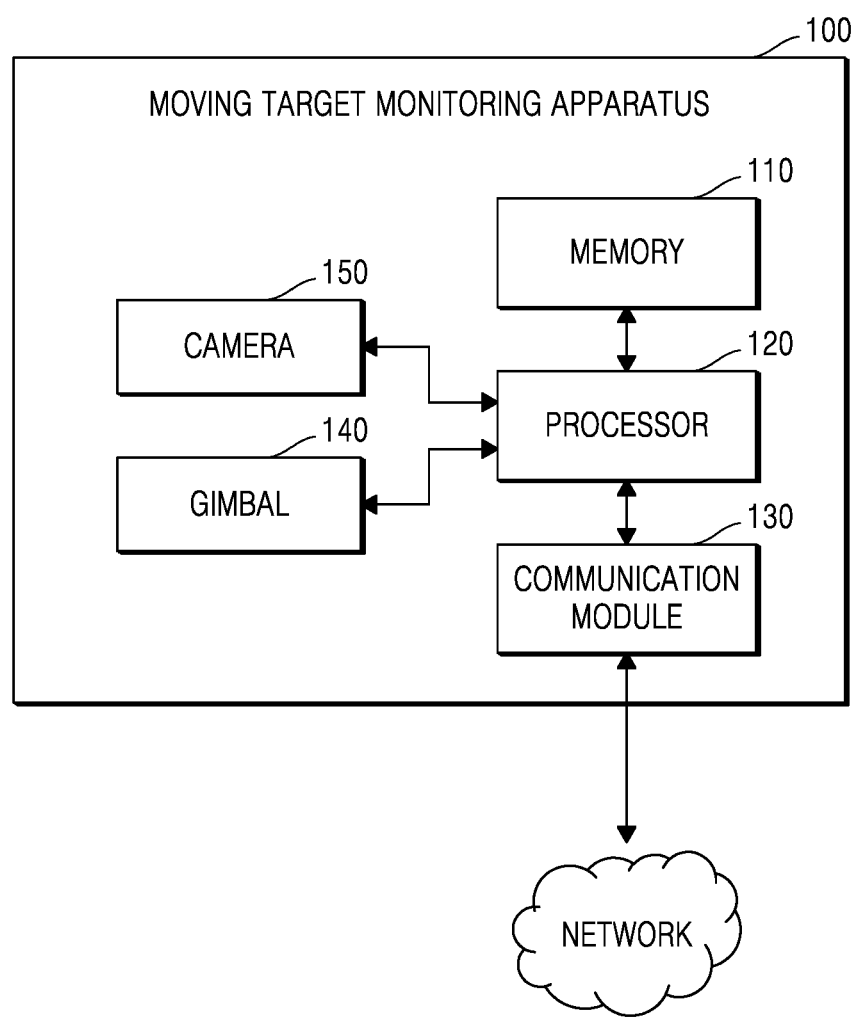
FIG. 1 is a block diagram illustrating a structure and operation of an apparatus for monitoring a moving target, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

While example embodiments are capable of various modifications and alternative forms, particular embodiments thereof are shown by way of example in the drawings and will herein be described in detail. Effects and features of the disclosure and methods of achieving them will become apparent with reference to embodiments described below in detail with reference to the drawings. However, the disclosure is not limited to the embodiments disclosed below, but may be implemented in various forms.

Hereinafter, embodiments will be described in detail with reference to the accompanying drawings, and like reference numerals in the drawings denote like elements, and thus their description will be omitted.

In the embodiments below, the terms first, second, etc. are used herein for the purpose of distinguishing one component from another component rather than limiting the meaning. In addition, the singular forms are intended to include the plural forms as well, unless the context clearly indicates otherwise. Also, the terms "comprises", "comprising", "includes", "including", "has", and/or "having" when used herein, specify the presence of stated features, elements, and/or components, but do not preclude the presence or addition of one or more other features, elements, components, and/or groups thereof.

In the drawings, the sizes of components may be exaggerated or reduced for convenience of description. For example, since the size and thickness of each component shown in the drawings are arbitrarily shown for convenience of description, the disclosure is not necessarily limited to those illustrated.

In the following embodiments, when a part such as a region, component, part, block, or module is referring to as being on or above another part, it may be directly on or above another part, or an intervening region, component, part, block, or module may also be present. In addition, when a region, component, part, block, module, or the like is referred to as being "connected to" or "coupled to" another region, component, part, block, module, or the like, it may be directly connected or coupled to the other region, component, part, block, or module, or intervening regions, components, parts, blocks, or modules may be present.

Hereinafter, various embodiments will be described in detail with reference to the accompanying drawings to easily implement the disclosure by one of ordinary skill in the art.

Figure 2:
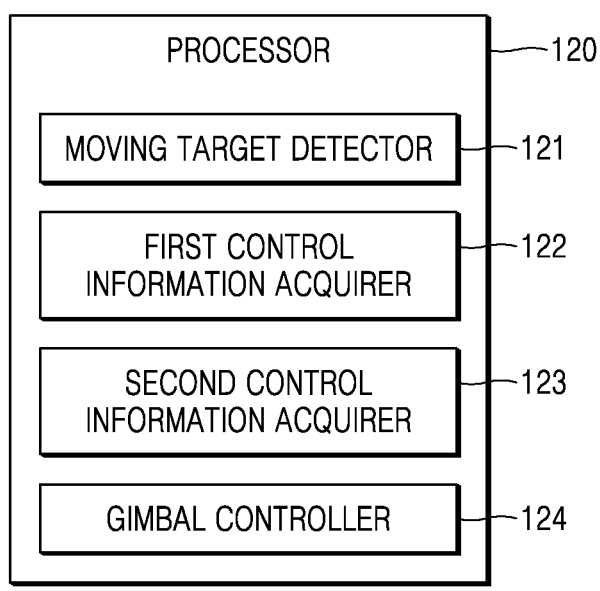
FIG. 2 is a block diagram illustrating a structure of a processor of an apparatus for monitoring a moving target, according to an embodiment.

FIG. 1 is a block diagram illustrating a structure and operation of an apparatus for monitoring a moving target, according to an embodiment. FIG. 2 is a block diagram illustrating a structure of a processor of an apparatus for monitoring a moving target, according to an embodiment.

Referring to FIG. 1, a moving target monitoring apparatus 100 according to an embodiment may include a memory 110, a processor 120, and a communication module 130. In addition, the moving target monitoring apparatus 100 according to an embodiment may include a gimbal 140 and a camera 150. However, the disclosure is not limited thereto, and the moving target monitoring apparatus 100 may further include other components, or some components may be omitted. Some components of the moving target monitoring apparatus 100 may be separated into a plurality of devices, or a plurality of components may be merged into one apparatus.

The memory 110 may be a computer-readable recording medium and may include a permanent mass storage device such as random access memory (RAM), read only memory (ROM), or a disk drive. In addition, the memory 110 may temporarily or permanently store a program code for controlling the moving target monitoring apparatus 100.

The processor 120 may detect a moving target on the basis of information regarding an image acquired from a camera mounted on a gimbal, acquire first control information of an operator regarding the gimbal 140, which is input in response to the moving target, acquire second control information regarding the gimbal 140, which is calculated in response to an operation of detecting the moving target, and control the gimbal 140 on the basis of the first control information and the second control information. Here, the second control information may be calculated on the basis of first displacement information regarding a detection location of the moving target from a central point of a screen of the image and second displacement information regarding a movement location of the moving target from the detection location.

The communication module 130 may provide a function for communicating with an external apparatus via a network. For example, a request, which is generated by the processor 120 of the moving target monitoring apparatus 100 according to a program code stored in a recording device such as the memory 110, may be transmitted to the external apparatus via the network under control of the communication module 130. In contrast, a control signal, a command, content, a file, or the like, which is provided under control of a processor of the external apparatus, may be received by the moving target monitoring apparatus 100 via the network under control of the communication module 130. For example, the control signal or command of the external apparatus, which is received via the communication module 130, may be transmitted to the processor 120 or the memory 110.

A communication method is not limited, and may include a short-range wireless communication method between devices, as well as a communication method using a communication network (e.g., a mobile communication network, the wired Internet, the wireless Internet, or a broadcasting network) that may be included in the network. For example, the network may include any one or more networks from among networks such as a personal area network (PAN), a local area network (LAN), a campus area network (CAN), a metropolitan area network (MAN), a wide area network (WAN), a broadband network (BBN), and the Internet. In addition, the network may include any one or more of network topologies including a bus network, a star network, a ring network, a mesh network, a star-bus network, a tree, or hierarchical network, and the like, but is not limited thereto.

In addition, the communication module 130 may communicate with the external apparatus via the network. The communication method is not limited, but the network may be a short-range wireless communication network. For example, the network may be a Bluetooth, Bluetooth low energy (BLE), or WiFi communication network.

The camera 150 may be a photographing device mounted on a fixed or mobile platform. For example, the camera 150 may photograph the moving target and transmit, to the processor 120, image information obtained by photographing the moving target. In addition, the camera 150 may be mounted on a gimbal on the fixed or mobile platform. For example, the camera 150 may adjust a camera photographing angle according to control of the gimbal.

The gimbal 140 may be a gimbal device mounted on the fixed or mobile platform. For example, the camera 150 may be mounted on the gimbal 140. For example, the gimbal 140 may control a photographing angle of the camera 150.

In addition, the moving target monitoring apparatus 100 according to the disclosure may include an input/output interface. The input/output interface may be a unit for an interface with an input/output device. For example, the input device may include a device such as a keyboard or mouse, and the output device may include a device such as a display for displaying a communication session of an application. As another example, the input/output interface may be a unit or an interface with a device in which functions for input and output are integrated into one, such as a touch screen. In a more detailed example, when the processor 120 of the moving target monitoring apparatus 100 processes the command of the computer program loaded into the memory 110, a service screen or content, which is configured by using data provided by an external server, may be displayed on a display via the input/output interface.

In addition, in other embodiments, the moving target monitoring apparatus 100 may include more components than the components of FIG. 1. For example, the moving target monitoring apparatus 100 may be implemented to include at least some of the input and output devices described above, or may further include other components such as a battery and a charging device that supply power to internal components, various types of sensors, and a database.

Hereinafter, an internal structure of the processor 120 of the moving target monitoring apparatus 100 according to an embodiment will be described in detail with reference to FIG. 2. For ease of understanding, a processor 120 described below may be described as being the processor 120 of the moving target monitoring apparatus 100 illustrated in FIG. 1.

The processor 120 of the moving target monitoring apparatus 100 according to an embodiment includes a moving target detector 121, a first control information acquirer 122, a second control information acquirer 123, and a gimbal controller 124. According to some embodiments, components of the processor 120 may be selectively included in or excluded from the processor 120. In addition, according to some embodiments, the components of the processor 120 may be separated or merged to represent functions of the processor 120.

Figure 3:
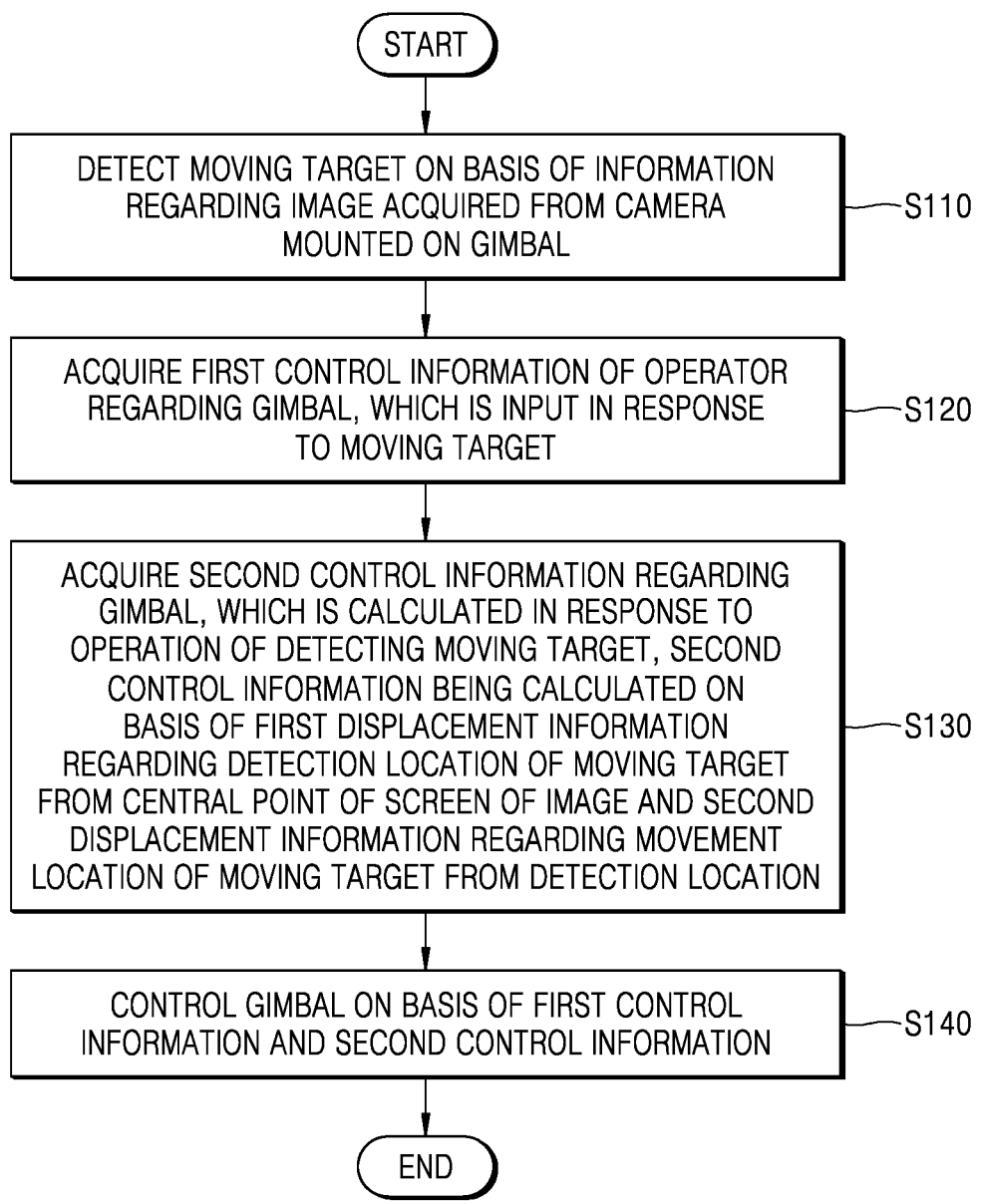
FIG. 3 is a flowchart illustrating a method of monitoring a moving target, according to an embodiment.

The processor 120 and the components of the processor 120 may control the moving target monitoring apparatus 100 to perform operations S110 to S140 included in a method of monitoring a moving target, illustrated in FIG. 3. For example, the processor 120 and the components of the processor 120 may be implemented to execute an instruction according to code of an operating system (OS) and code of at least one program that are included in the memory 110. Here, the components of the processor 120 may be expressions of different functions of the processor 120 performed by the processor 120 according to an instruction provided by program code stored in the moving target monitoring apparatus 100. The internal structure and detailed operation of the processor 120 will be described with reference to the flowchart of the method of monitoring a moving target, illustrated in FIG. 3.

FIG. 3 is a flowchart illustrating a method of monitoring a moving target, according to an embodiment.

Referring to FIG. 3, in operation S110, the processor 120 may detect a moving target on the basis of information regarding an image, which is acquired from a camera mounted on a gimbal.

In operation S120, the processor 120 may acquire first control information of an operator regarding the gimbal, which is input in response to the moving target.

In operation S130, the processor 120 may acquire second control information regarding the gimbal, which is calculated in response to the operation of detecting the moving target.

In operation S140, the processor 120 may control the gimbal on the basis of the first control information and the second control information. Here, the second control information may be calculated on the basis of first displacement information regarding a detection location of the moving target from a central point of a screen of the image and second displacement information regarding a movement location of the moving target from the detection location.

The processor 120 according to an embodiment may control the gimbal on the basis of the first control information and the second control information by giving a predetermined weight to the first control information compared to the second control information.

The processor 120 according to an embodiment may calculate, on the basis of the first displacement information, a pixel error value between the central point of the screen of the image and the detection location of the moving target. In addition, the processor 120 may calculate a gimbal movement angle step that divides the pixel error value in phases by using a minimum value and a maximum value of a gimbal movement angle step determined in advance for the pixel error value. In addition, the processor 120 may control the gimbal on the basis of the gimbal movement angle step.

In addition, the processor 120 according to an embodiment may continuously control the gimbal by maintaining the gimbal movement angle step. In addition, the processor 120 may calculate a current gimbal orientation angle of the gimbal on the basis of information acquired from a gimbal sensor provided in the gimbal. In addition, the processor 120 may calculate a target gimbal orientation angle of the gimbal on the basis of the first displacement information. In addition, the processor 120 may stop an operation of the gimbal on the basis of the current gimbal orientation angle and the target gimbal orientation angle.

In addition, the processor 120 according to an embodiment may stop the operation of the gimbal on the basis of a difference between the current gimbal orientation angle and the target gimbal orientation angle.

In addition, the processor 120 according to an embodiment may calculate the second displacement information regarding the movement location from the detection location of the moving target between detection units in the operation of detecting the moving target. In addition, the processor 120 may correct the second displacement information on the basis of location information of the moving target acquired from a navigation device provided in the moving target.

Figure 4:
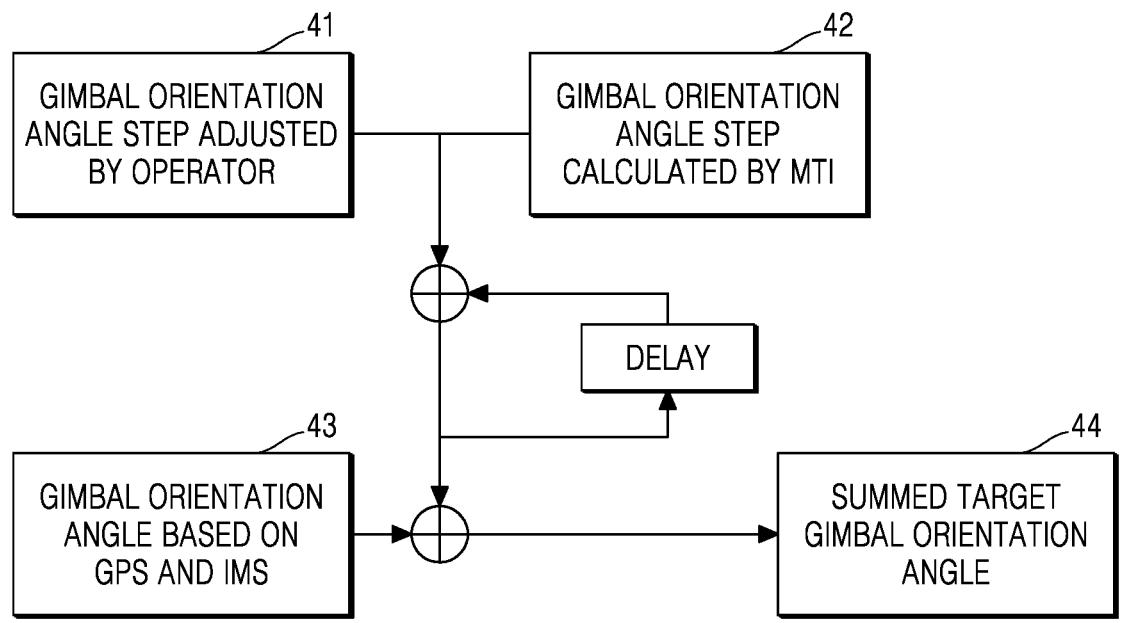
FIG. 4 is a diagram illustrating a method of calculating a gimbal orientation angle, according to an embodiment.

FIG. 4 is a diagram illustrating a method of calculating a gimbal orientation angle, according to an embodiment.

FIG. 4 illustrates a flowchart for calculating a gimbal orientation angle of a gimbal, according to an embodiment.

A moving target monitoring apparatus provided in the disclosure is an apparatus that assists an operator in controlling a gimbal mounted with a camera on a fixed or mobile platform and simultaneously detecting a moving target by an MTI technology based on image information acquired from the camera to assist the operator in controlling the gimbal. In other words, when a gimbal manipulation operation assistance function is set to operate, the moving target monitoring apparatus accessorily performs automatic gimbal control on the basis of the MTI technology along with the gimbal control by the operator. However, the moving target monitoring apparatus may be a system that always accepts a gimbal movement command of the operator, and may simultaneously perform control by an MTI and control by the operator and preferentially perform the control by the operator. In addition, the moving target monitoring apparatus may be controlled only by a gimbal manipulation by the operator when the gimbal manipulation operation assistance function is manipulated by on and/or off to be set to not operate.

For example, as illustrated in FIG. 4, in the moving target monitoring apparatus of the disclosure, a gimbal orientation angle command may be calculated by adding up a gimbal orientation angle step 41 adjusted by the operator, a gimbal orientation angle step 42 calculated by an MTI, and a gimbal orientation angle 43 based on a GPS and an IMS. For example, the gimbal orientation angle step 41 adjusted by the operator represents a gimbal orientation angle command by the operator. In addition, the gimbal orientation angle step 42 calculated by the MTI represents a gimbal orientation angle command by the MTI. In addition, the gimbal orientation angle 43 based on the GPS and the IMS represents a target orientation angle command based on a location and posture angle of the mobile platform and a target candidate location.

Simultaneous consideration of the gimbal manipulation by the operator and an automatic gimbal adjustment function based on the MTI technology may be determined by the sum of weights between two items, and an amount of the gimbal manipulation by the operator may be set to be greater than gimbal control by an MTI technique, and thus, the weight may give a higher priority to the gimbal control by the operator than the gimbal control by the MTI technique.

Figure 5:
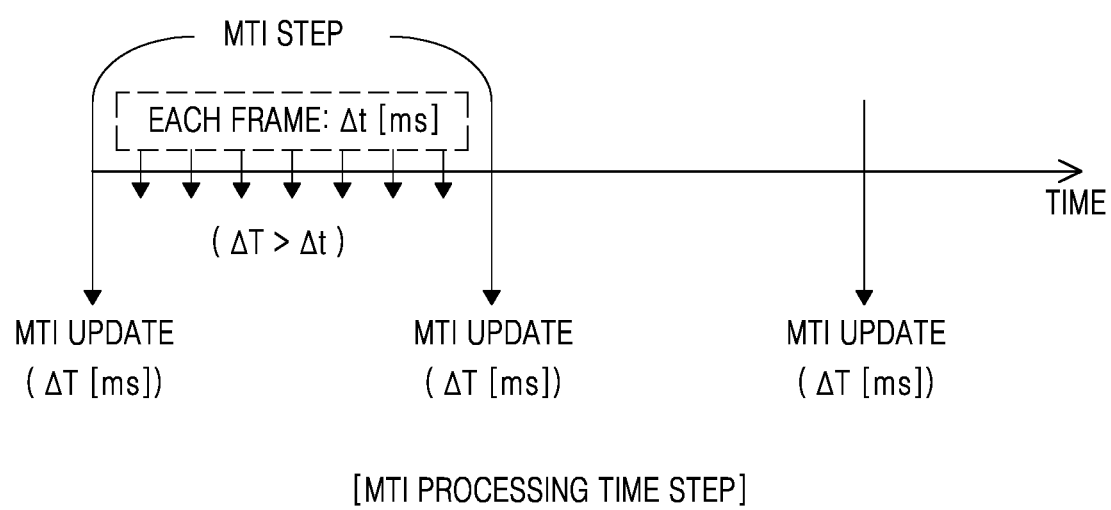
FIG. 5 is a view illustrating a relationship between a moving target indication (MTI) processing operation time interval and an image input period interval, according to an embodiment.
Figure 6:
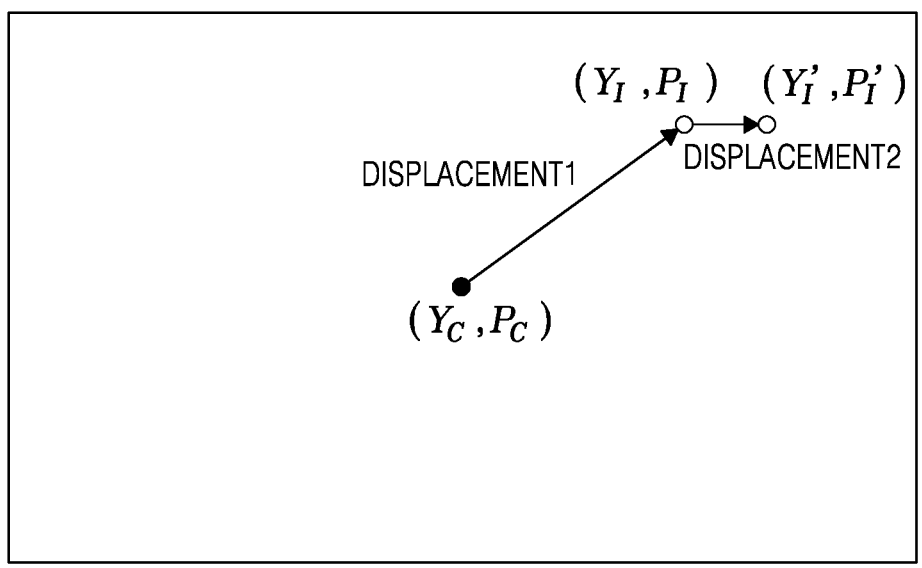
FIG. 6 is a view illustrating location information of a moving target according to an embodiment.

FIG. 5 is a view illustrating a relationship between an MTI processing operation time interval and an image input period interval, according to an embodiment. In addition, FIG. 6 is a view illustrating location information of a moving target, according to an embodiment.

The disclosure provides a method as follows to continuously control a gimbal by using a result of an MTI technique updated in each of discontinuous frames due to a characteristic of an embedded system having a relatively high computational amount on the basis of an image acquired from a camera mounted on a fixed or mobile platform. Here, when the gimbal is controlled by using the result of the MTI technique, in particular, when a location of a moving target is distant from a central point of the image, an amount of movement of the gimbal may be too great and fast, and thus, the continuity of the location of the moving target may be unstable. Therefore, a smooth MTI result may not be obtained. Therefore, the disclosure provides a method as follows to calculate a micro-sized gimbal movement angle step by using location information of a moving target acquired from an MTI technique to perform gimbal control so that the moving target is gradually located at a central point of an image and to enable continuous gimbal control even when an MTI operation processing period is greater than a gimbal control period.

In a gimbal control system provided in the disclosure, gimbal control is divided into three categories described below and processed, according to a period in which a gimbal orientation angle command is processed, and the processing period will be described with reference to FIG. 5. In addition, an MTI technique applied in the system of the disclosure may use a technique capable of determining start and end states of an MTI processing process.

(1) Process whenever an MTI operation result is generated (process at each $\Delta T$ in FIG. 5)

An MTI technology is applied to an input image to calculate a pixel error value between a central point of the input image and a location of a moving target detected by an MTI. Gimbal movement angle steps ($\Delta Y_I$, $\Delta P_I$) in a yaw direction and a pitch direction are calculated from the acquired pixel error value ($PB_X$, $PB_Y$), and are mathematically expressed as in Equation 1 below.

$$\Delta Y_I = \max\left[\Delta Y_{I\_MIN}, \min\left\{\Delta Y_{I\_MAX}, \Delta Y_{I\_MAX} \times \left(\frac{PE_X}{PE_{X\_MAX}}\right)\right\}\right]$$

$$\Delta P_I = \max\left[\Delta P_{I\_MIN}, \min\left\{\Delta P_{I\_MAX}, \Delta P_{I\_MAX} \times \left(\frac{PE_Y}{PE_{Y\_MAX}}\right)\right\}\right]$$

⟨Equation 1⟩

Here, respective items in Equation 1 are defined as follows.

min(x, y): Output a minimum value from among two factors x and y that are input max (x, y): Output a maximum value of the two factors x and y that are input ($\Delta Y_{I\_MIN}$, $\Delta P_{I\_MIN}$): Minimum values of the gimbal movement angle steps (<0)

($\Delta Y_{I\_MAX}$, $\Delta P_{I\_MAX}$): Maximum values of the gimbal movement angle steps (>0)

($PB_X$, $PB_Y$): Pixel error values in x-axis and y-axis directions by MTI ($PB_{X\_MAX}$, $PB_{Y\_MAX}$): Theoretical maximum values of pixel error values in the x-axis and y-axis directions by MTI (determined by an image size)

In addition, gimbal target orientation angles ($Y_I$, $P_I$) in the yaw direction and the pitch direction are calculated from the acquired pixel error values ($PB_X$, $PB_Y$). Here, ($Y_I$, $P_I$) is calculated as in Equation 2 below.

$$(Y_I, P_I) = (PB_X \times IFOV_X, PB_Y \times IFOV_Y) \quad \text{⟨Equation 2⟩}$$

Here, respective items in Equation 2 are defined as follows.

($IFOV_X$, $IFOV_Y$) = ($FOV_X/PN_X$, $FOV_Y/PN_Y$), ($FOV_X$, $FOV_Y$) = angles of view of camera sensor in x-axis and y-axis directions, ($PN_X$, $PN_Y$) = numbers of pixels of camera sensor in x-axis and y-axis directions Meanwhile, a current gimbal orientation angle ($Y_C$, $P_C$) is calculated on the basis of information acquired from a mounted gimbal sensor, and signs for respective elements of {($Y_I - Y_C$), ($P_I - P_C$)} are stored on the basis of the current gimbal orientation angle, and a target gimbal orientation angle based on an MTI calculation result.

(2) Process at each frame (process at each $\Delta t$ in FIG. 5)

A procedure processed at frame for gimbal control is as follows. Control is continuously performed while maintaining the gimbal movement angle steps ($\Delta Y_I$, $\Delta P_I$). Here, when a gimbal movement stop condition is checked and is satisfied, an operation of a gimbal is stopped. The gimbal movement stop condition is as follows.

Calculate {($Y_I - Y_C'$), ($P_I - P_C'$)} by using ($Y_C'$, $P_C'$) that is updated at each frame Check whether or not signs of respective elements of {($Y_I - Y_C'$), ($P_I - P_C'$)} are changed compared to {($Y_I - Y_C$), ($P_I - P_C$)} and set respective elements of ($\Delta Y_I$, $\Delta P_I$) to 0 for respective axes of the yaw direction and the pitch direction to stop the operation of the gimbal independently (3) Process only when a first MTI result comes out The MTI technique applied in the disclosure may use a technique capable of determining start and end states, ($Y_{I\_off}$, $P_{I\_off}$), is stored for a complementary gimbal control method when the result of the MTI technique is first produced. Here, ($Y_{I\_off}$, $P_{I\_off}$) is expressed as in Equation 3 below.

$$(Y_{I\_off}, P_{I\_off}) = (Y_C - Y_I, P_C - P_I) \quad \text{⟨Equation 3⟩}$$

When gimbal control is performed by updating only micro-movement angle steps ($\Delta Y_I$, $\Delta P_I$), a gimbal control speed may be slower than a speed of change in location information of a target at a relatively short range. In contrast, when the size of a stepwise micro-movement angle is set to be too large, the location continuity of the target may be unstable when applying an image-based MTI technology, and image information may degraded by motion blur. Therefore, smooth MTI performance may be highly likely to deteriorate. Accordingly, the disclosure provides a complementary gimbal control method for performing gimbal control with respect to a central point of an image having a relatively large displacement amount and a location of a moving target (displacement 1 in FIG. 6, e.g., the displacement 1 represents a location of the moving target from the central point of the image) according to the result of the MTI technique by updating stepwise micro-movement angles ($\Delta Y_I$, $\Delta P_I$) so that an MTI technology may be stably applied through smooth gimbal movement, and performing gimbal control with respect to an amount of movement of the moving target between frames (displacement 2 in FIG. 6, e.g., the displacement 2 represents a location of the moving target due to movement between frames) by additionally correcting and updating a direct satellite movement angle command ($Y_T$, $P_T$) acquired via GPS and IMS equipment. Here, the amount of movement of the moving target may be stably controlled by limiting an absolute size to a particular range due to characteristics of the MTI technique. Meanwhile, when a distance between a target and a platform is short, a gimbal control speed needs to be greater and may be compensated for by additionally correcting, updating, and executing the direct satellite movement angle command ($Y_T$, $P_T$). The provided gimbal control technology, which is constructed by complementarily using the two methods, is described in detail as follows.

Gimbal control for the amount of movement of the target calculated for each MTI operation unit is performed by updating the direct satellite movement angle command ($Y_T$, $P_T$). Here, the absolute size of the movement amount of the target is limited due to the characteristics of the MTI technique, and thus may be stably controlled. Also, when the distance between the target and the platform is short, the gimbal control speed needs to be greater and may be compensated for. In addition, the concept of compensation through ($Y_{T\_off}$, $\Delta P_{T\_off}$) is provided to compensate for an amount of a change in ($Y_T$, $P_T$) occurring due to a greater MTI update time than a location information update period of a sensor when calculating a target orientation angle command based on a location and posture angle of a mobile platform and the location of the target. A process processed at each MTI update is expressed as in Equation 4 below.

$$Y_T = Y_I' + Y_{I\_off} + Y_{T\_off}$$

$$P_T = P_I' + P_{I\_off} + P_{T\_off} \quad \text{<Equation 4>}$$

Here, respective items in Equation 4 are defined as follows.

($Y_I'$, $P_I'$)=Gimbal target angles in the yaw and pitch directions, which are converted from pixel error values calculated at each MTI update ($Y_I'$, $P_I'$)=Differences between current gimbal angles and gimbal target angles in the yaw and pitch directions calculated during a first MTI operation ($Y_{T\_off}$, $P_{T\_off}$)=Correction values of target candidate location orientation angles in the yaw and pitch directions, which are acquired at each frame due to a long MTI update period and are calculated by a GPS and an IMS The process processed at each frame is mathematically expressed as in Equation 5 below.

$$(Y_{T\_off}, P_{T\_off}) = (Y_T' - Y_{T\_prev}, P_T' - P_{T\_prev}) \quad \text{<Equation 5>}$$

Here, respective items in Equation 5 are defined as follows.

($Y_T'$, $P_T'$)=New ($Y_T$, $P_T$) that is updated at each frame ($Y_{T\_prev}$, $P_{T\_prev}$) of previous frame In addition, the process, which is processed only when the first MTI result comes out, is expressed as in Equation 6.

$$(Y_{I\_off}, P_{I\_off}) = (Y_C - Y_I, P_C - P_I) \quad \text{<Equation 6>}$$

Here, respective items in Equation 6 are defined as follows.

($Y_C$, $P_C$)=Current gimbal orientation angles ($Y_I$, $P_I$)=Gimbal target angles in the yaw and pitch directions, which are converted from pixel error values calculated as a result of first application of an MTI Gimbal control for the location of the target according to the MTI result and the central point of the image is performed by updating the stepwise micro-movement angle step ($\Delta Y_I$, $\Delta P_I$). Even when an amount of displacement of the central point of the image and the MTI result is relatively great, control may be stably performed so that the MTI technology may be applied, due to a maximum control interval that is set in a particular range when processing each control moment.

According to the disclosure, provided is a moving target monitoring system that assists an operator in operating gimbal manipulation operation by detecting a moving target by using image information acquired from a camera installed on a fixed or mobile platform. Here, the key is a technology that controls by combining target candidate location orientation angle information calculated from information acquired from a navigation device such as a GPS or an INS, gimbal manipulation information of the operator, gimbal manipulation information by an MTI technology, and the like. Meanwhile, a gimbal manipulation by the MTI technology needs a technology that continuously controls a gimbal when a processing period of the MTI technology is longer than each frame interval of an image as most image processing-based MTI technologies operating in an embedded system have a high computational volume. Accordingly, the disclosure provides a continuous gimbal control method for using discontinuous MTI technology. In addition, a system that may stably link with MTI technology is invented and provided by devising a complementary gimbal control method through displacement partitioning based on MTI technology.

According to the disclosure, a moving target monitoring system, which assists an operator in operating a gimbal manipulation by detecting a moving target from image information acquired from a camera mounted on a fixed or mobile platform, may assist the operator in a surveillance and reconnaissance process by combining and using target candidate location information, gimbal control information of the operator, and gimbal control information based on target detection information by MTI technology. In addition, the operator may expand the range of operation by selectively determining whether or not to perform automatic gimbal control for an MTI function.

An MTI technology-based gimbal control technology provided for a system described above may provide the operator with image information acquired from a camera mounted on a gimbal without shaking or interruption by continuously controlling the gimbal by using the result of an MTI technique calculated for each discontinuous image frame. In addition, the reliability of MTI technology may be improved through stable linkage between the MTI technology and gimbal control. Meanwhile, stable gimbal control and relatively fast gimbal control for a target at a short range may be performed based on complementary gimbal control through displacement partitioning, and thus, the robustness of the system may be secured.

According to an embodiment as described above, an apparatus and method for monitoring a moving target based on complementary gimbal control through displacement partitioning may be implemented. The scope of the disclosure is not limited by the effects described above.

The apparatuses and/or systems described above may be implemented via hardware components, software components, and/or combinations of hardware components and software components. The apparatuses and components described in the embodiments may be implemented, for example, by using one or more general-purpose computers or special-purpose computers such as a processor, a controller, an arithmetic logic unit (ALU), a digital signal processor, a microcomputer, a field programmable gate array (FPGA), a programmable logic unit (PLU), a microprocessor, or any other apparatus capable of executing and responding to instructions. A processing apparatus may perform an OS and one or more software applications executed on the OS. In addition, the processing apparatus may access, store, manipulate, process, and generate data in response to the execution of software. For convenience of understanding, one processing apparatus may be described as being used, but one of ordinary skill in the art may understand that the processing apparatus may include a plurality of processing elements and/or a plurality of types of processing elements. For example, the processing apparatus may include a plurality of processors, or one processor and one controller. In addition, other processing configurations, such as parallel processors, are also possible.

The software may include a computer program, code, an instruction, or a combination of one or more thereof, and may configure the processing apparatus to operate as desired or command the processing apparatus independently or collectively. The software and/or data may be permanently or temporarily embodied in any type of machine, component, physical equipment, virtual equipment, computer storage medium, or device, or signal wave transmitted, to be interpreted by the processing apparatus or to provide command or data to the processing apparatus. The software may be distributed on a network-connected computer system and stored or executed in a distributed manner. The software and data may be stored in one or more computer-readable recording media.

The method according to an embodiment may be implemented in the form of a program instruction that may be performed through various computer means and recorded on a computer-readable medium. The computer-readable medium may include a program command, a data file, a data structure, or the like alone or in combination. The program instruction recorded on the medium may be specially designed and configured for embodiments, or may be known to and available to one of ordinary skill in computer software. Examples of the computer-readable recording media include magnetic media such as a hard disk, a floppy disk, and a magnetic tape, optical media such as CD-ROM and DVD, magneto-optical media such as a floptical disk, and a hardware device specially configured to store and execute program instructions, such as ROM, RAM, and flash memory. Examples of the program instructions include machine language code, such as those generated by a compiler, as well as high-level language code that may be executed by a computer by using an interpreter or the like. The hardware device described above may be configured to operate as one or more software modules to perform an operation of the embodiment, and the reverse thereof is the same.

Although embodiments have been described with reference to limited embodiments and drawings as above, various modifications and modifications may be made from the above description by one of ordinary skill in the art. For example, even when the described technologies are performed in a different order from the described method, and/or components such as the described system, structure, device, and circuit are combined in a different form from the described method, or replaced or substituted by other components or equivalents, appropriate results may be achieved.

Therefore, other implementations, other embodiments, and those equivalent to claims fall within the scope of the claims described below.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An apparatus for monitoring a moving target, the apparatus comprising a processor configured to: detect the moving target on the basis of information regarding an image acquired from a camera mounted on a gimbal; acquire first control information of an operator regarding the gimbal, which is input in response to the moving target; acquire second control information regarding the gimbal, which is calculated in response to the operation of detecting the moving target; and control the gimbal on the basis of the first control information and second control information, wherein the second control information is calculated on the basis of first displacement information regarding a detection location of the moving target from a central point of a screen of the image and second displacement information regarding a movement location of the moving target from the detection location, wherein the processor is further configured to calculate, on the basis of the first displacement information, a pixel error value between the central point of the screen of the image and the detection location of the moving target, calculate a gimbal movement angle step that divides the pixel error value in phases by using a minimum value and a maximum value of a gimbal movement angle step determined in advance for the pixel error value, and control the gimbal on the basis of the gimbal movement angle step.

2. The apparatus of claim 1, wherein the processor is further configured to control the gimbal on the basis of the first control information and the second control information by giving a predetermined weight to the first control information compared to the second control information.

3. The apparatus of claim 1, wherein the processor is further configured to continuously control the gimbal by maintaining the gimbal movement angle step, calculate a current gimbal orientation angle on the basis of information acquired from a gimbal sensor provided in the gimbal, calculate a target gimbal orientation angle on the basis of the first displacement information, and stop an operation of the gimbal on the basis of the current gimbal orientation angle and the target gimbal orientation angle.

4. The apparatus of claim 3, wherein the processor is further configured to stop the operation of the gimbal on the bias of a difference between the current gimbal orientation angle and the target gimbal orientation angle.

5. The apparatus of claim 1, wherein the processor is further configured to calculate second displacement information regarding a movement location from the detection location of the moving target between detection units in the operation of detecting the moving target and correct the second displacement information on the basis of location information of the moving target.

6. A method of monitoring a moving target, the method comprising:
  detecting a moving target on the basis of information regarding an image acquired from a camera mounted on a gimbal;
  acquiring first control information of an operator regarding the gimbal, which is input in response to the moving target;
  acquiring second control information regarding the gimbal, which is calculated in response to the operation of detecting the moving target; and
  controlling the gimbal on the basis of the first control information and the second control information, wherein the second control information is calculated on the basis of first displacement information regarding a detection location of the moving target from a central point of a screen of the image and second displacement information regarding a movement location of the moving target from the detection location,
  wherein the controlling the gimbal on the basis of the first control information and the second control information includes:
  calculating, on the basis of the first displacement information, a pixel error value between the central point of the screen of the image and the detection location of the moving target;
  calculating a gimbal movement angle step that divides the pixel error value in phases by using a minimum value and a maximum value of a gimbal movement angle step determined in advance for the pixel error value; and
  controlling the gimbal on the basis of the gimbal movement angle step.

7. The method of claim 6, wherein the controlling the gimbal on the basis of the first control information and the second control information includes controlling the gimbal on the basis of the first control information and the second control information by giving a predetermined weight to the first control information compared to the second control information.

8. The method of claim 6, wherein the controlling the gimbal on the basis of the gimbal movement angle step includes:
  continuously controlling the gimbal by maintaining the gimbal movement angle step;
  calculating a current gimbal orientation angle of the gimbal on the basis of information acquired from a gimbal sensor provided in the gimbal;
  calculating a target gimbal orientation angle of the gimbal on the basis of the first displacement information; and
  stopping an operation of the gimbal on the basis of the current gimbal orientation angle and the target gimbal orientation angle.

9. The method of claim 8, wherein the stopping the operation of the gimbal includes stopping the operation of the gimbal on the basis of a difference between the current gimbal orientation angle and the target gimbal orientation angle.

10. The method of claim 6, wherein the controlling the gimbal on the basis of the first control information and the second control information includes:
  calculating second displacement information regarding a movement location from the detection location of the moving target between detection units in the operation of detecting the moving target; and
  correcting the second displacement information on the basis of location information of the moving target acquired from a navigation device provided in the moving target.

11. A computer program stored in a non-transitory recording medium to execute the method of claim 6 by using a computing apparatus.

* * * * *